US012608753B2

(12) United States Patent　　　　(10) Patent No.: US 12,608,753 B2
Blinzer et al.　　　　　　　　　　　(45) Date of Patent: Apr. 21, 2026

(54) SMART ACCESS STREAMING

(71) Applicant: Advanced Micro Devices, Inc., Santa Clara, CA (US)

(72) Inventors: Paul Blinzer, Bellevue, WA (US); David Livingstain Ziman, McKinney, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 131 days.

(21) Appl. No.: 18/478,582

(22) Filed: Sep. 29, 2023

(65) Prior Publication Data

US 2025/0111469 A1　　Apr. 3, 2025

(51) Int. Cl.
　　*G06T 1/60*　　　　(2006.01)
　　*G06T 15/00*　　　(2011.01)
　　*G06T 15/04*　　　(2011.01)
(52) U.S. Cl.
　　CPC .............. *G06T 1/60* (2013.01); *G06T 15/005* (2013.01); *G06T 15/04* (2013.01); *G06T 2210/36* (2013.01)
(58) Field of Classification Search
　　CPC ......... G06T 1/60; G06T 15/005; G06T 15/04; G06T 2210/36
　　See application file for complete search history.

(56) References Cited

U.S. PATENT DOCUMENTS

| | | | |
|---|---|---|---|
| 5,274,754 A | 12/1993 | Sfarti | |
| 5,495,563 A | 2/1996 | Winser | |

| | | | |
|---|---|---|---|
| 5,818,456 A | 10/1998 | Cosman et al. | |
| 5,870,509 A | 2/1999 | Alcorn | |
| 6,339,426 B1 | 1/2002 | Lui et al. | |
| 6,525,723 B1 | 2/2003 | Deering | |
| 7,136,068 B1 | 11/2006 | Priem et al. | |
| 7,456,846 B1 | 11/2008 | King et al. | |
| 7,684,641 B1 | 3/2010 | Toksvig | |
| 7,710,425 B1 | 5/2010 | Baldwin | |
| 7,916,155 B1 | 3/2011 | Moreton | |
| 8,269,788 B2 | 9/2012 | Tuomi | |

(Continued)

FOREIGN PATENT DOCUMENTS

| | | |
|---|---|---|
| JP | 2004088251 A | 3/2004 |

OTHER PUBLICATIONS

Sander, "AMD GCN Assembly: Cross-Lane Operations", Aug. 10, 2016, "https://gpuopen.com/learn/amd-gcn-assembly-cross-lane-operations/", pp. 1-14 (Year: 2016).

(Continued)

*Primary Examiner* — Priyank J Shah
(74) *Attorney, Agent, or Firm* — Kowert, Hood, Munyon, Rankin & Goetzel, P.C.; Rory D. Rankin

(57)　　　　　　ABSTRACT

Systems, apparatuses, and methods for rendering textures by prefetching texture data are disclosed. Source texture data is identified based at least in part on one or more programmable instructions. A prefetch of the source texture data is caused based on level of details associated with the source texture data. Further, a list data blocks of the source texture data and a mapping between each data block and corresponding allocated memory address space allocated to each data block on the memory device is maintained. Responsive to a request to load a given data block, the given data block from the memory device is loaded using the list.

20 Claims, 6 Drawing Sheets

(56) References Cited

U.S. PATENT DOCUMENTS

| | | | |
|---|---|---|---|
| 8,345,063 B2 | 1/2013 | Iourcha et al. | |
| 8,928,690 B2 | 1/2015 | Brennan | |
| 9,019,299 B2 | 4/2015 | Iourcha et al. | |
| 10,152,772 B2 | 12/2018 | Fainstain | |
| 10,810,784 B1 * | 10/2020 | Rai | G06T 15/04 |
| 2001/0030655 A1 | 10/2001 | Anwar | |
| 2002/0093520 A1 | 7/2002 | Larson | |
| 2003/0043169 A1 | 3/2003 | Hunter | |
| 2003/0095134 A1 | 5/2003 | Tuomi et al. | |
| 2003/0206179 A1 | 11/2003 | Deering | |
| 2003/0206663 A1 | 11/2003 | Daly | |
| 2003/0210251 A1 | 11/2003 | Brown | |
| 2005/0062767 A1 | 3/2005 | Choe et al. | |
| 2006/0061592 A1 | 3/2006 | Akenine-Moller et al. | |
| 2006/0087518 A1 | 4/2006 | Ameline et al. | |
| 2006/0274078 A1 * | 12/2006 | Chung | G06T 15/04 |
| | | | 345/582 |
| 2007/0052718 A1 | 3/2007 | McKellar | |
| 2007/0257935 A1 | 11/2007 | Koduri et al. | |
| 2008/0012878 A1 | 1/2008 | Nystad et al. | |
| 2008/0303841 A1 | 12/2008 | Newhall et al. | |
| 2009/0046108 A1 | 2/2009 | Brown Elliott et al. | |
| 2009/0129664 A1 | 5/2009 | Tsuchiya et al. | |
| 2009/0167778 A1 | 7/2009 | Wei | |
| 2009/0195552 A1 | 8/2009 | Nystad | |
| 2009/0240931 A1 | 9/2009 | Coon et al. | |
| 2009/0256848 A1 | 10/2009 | Iourcha et al. | |
| 2010/0002000 A1 | 1/2010 | Everitt et al. | |
| 2010/0246692 A1 | 9/2010 | Rusanovskyy et al. | |
| 2010/0316254 A1 | 12/2010 | Kirsch et al. | |
| 2011/0142366 A1 | 6/2011 | Young | |
| 2011/0150331 A1 | 6/2011 | Young | |
| 2011/0249011 A1 | 10/2011 | Lalonde et al. | |
| 2011/0274175 A1 | 11/2011 | Sumitomo | |
| 2012/0127331 A1 | 5/2012 | Grycewicz | |
| 2013/0222442 A1 | 8/2013 | Gu et al. | |
| 2013/0249927 A1 | 9/2013 | Brennan | |
| 2014/0118352 A1 | 5/2014 | Hakura et al. | |
| 2014/0176541 A1 | 6/2014 | Surti et al. | |
| 2014/0267232 A1 | 9/2014 | Lum et al. | |
| 2014/0327696 A1 | 11/2014 | Pomianowski et al. | |
| 2015/0070381 A1 | 3/2015 | Lum et al. | |
| 2015/0193968 A1 | 7/2015 | Barringer et al. | |
| 2015/0311265 A1 | 10/2015 | Matsueda et al. | |
| 2016/0035129 A1 | 2/2016 | Bolz et al. | |
| 2016/0057420 A1 | 2/2016 | Pang et al. | |
| 2016/0203578 A1 | 7/2016 | Shoshan et al. | |
| 2016/0212332 A1 | 7/2016 | Tang et al. | |
| 2016/0366386 A1 | 12/2016 | Douady-Pleven et al. | |
| 2016/0379403 A1 | 12/2016 | Seiler | |
| 2017/0132833 A1 | 5/2017 | Sathe | |
| 2017/0206638 A1 | 7/2017 | Fainstain | |
| 2018/0158227 A1 | 6/2018 | Reshetov et al. | |
| 2019/0066370 A1 | 2/2019 | Schmalstieg et al. | |
| 2020/0027260 A1 | 1/2020 | Harris et al. | |
| 2020/0034214 A1 | 1/2020 | Vanco et al. | |
| 2020/0193697 A1 * | 6/2020 | Brennan | G06T 15/80 |
| 2023/0132931 A1 * | 5/2023 | Greathouse | G06F 3/0679 |
| | | | 711/154 |

OTHER PUBLICATIONS

International Search Report and Written Opinion of International Application No. PCT/US2024/033250, mailed Sep. 13, 2024, 9 pp.

Zhang Alex et al: "High-performance adaptive texture streaming and rendering of large 3D cities", Visual Computer, Springer, Berlin, DE, vol. 38, No. 4, Jun. 1, 2021 (Jun. 1, 2021), pp. 1245-1262.

International Search Report and Written Opinion in International Application No. PCT/US17/13786, mailed Apr. 4, 2017, 13 pages.

Non-Final Office Action in U.S. Appl. No. 15/408,054, mailed Oct. 10, 2017, 11 pages.

Final Office Action in U.S. Appl. No. 15/408,054, mailed Mar. 21, 2018, 11 pages.

Non-Final Office Action in U.S. Appl. No. 15/408,054, mailed Jul. 26, 2018, 14 pages.

* cited by examiner

*500*

*502*

CPU sends texture data to storage driver based on LOD values

*504*

Memory device loads texture data to accessible cache

*506*

Shader identifies current LOD

*508*

GPU issues direct memory access request to cache via storage driver

*510*

GPU renders texture based on accessed texture data

*600*

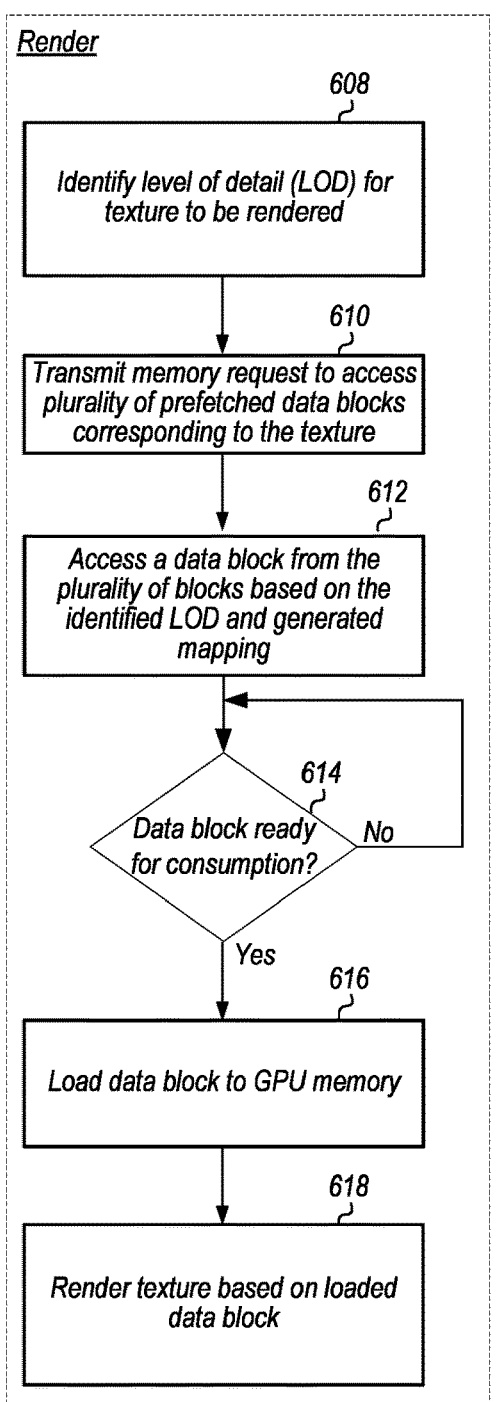

*Render*

*608*

Identify level of detail (LOD) for texture to be rendered

*610*

Transmit memory request to access plurality of prefetched data blocks corresponding to the texture

*612*

Access a data block from the plurality of blocks based on the identified LOD and generated mapping

*614*

Data block ready for consumption?    No

Yes    *616*

Load data block to GPU memory

*618*

Render texture based on loaded data block

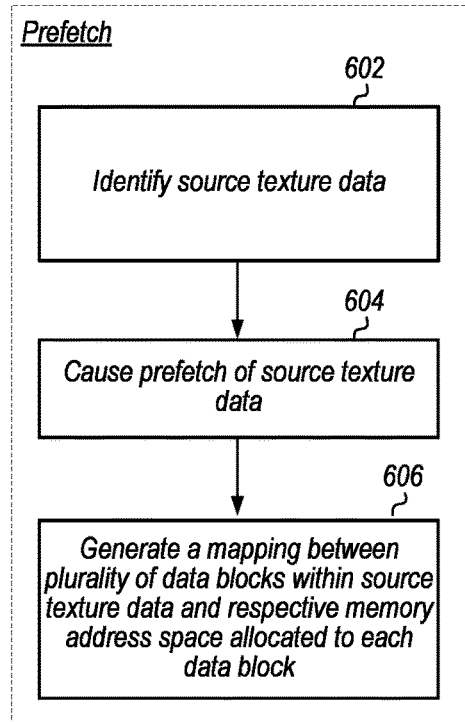

*Prefetch*

*602*

Identify source texture data

*604*

Cause prefetch of source texture data

*606*

Generate a mapping between plurality of data blocks within source texture data and respective memory address space allocated to each data block

*FIG. 6*

SMART ACCESS STREAMING

BACKGROUND

Description of the Related Art

Texture mapping is a technique in which a detailed texture is applied to a surface of a virtual object. As the distance of the virtual object from the camera varies from scene to scene, the resolution of a texture applied to the object likewise will vary. To account for these variations, texture maps in a mipmap structure (i.e., a mipmap) can be generated to improve a rendering speed of the graphics pipeline. The mipmap is a collection of bitmap images of a texture with successively reduced resolutions. The mipmap may contain multiple versions of the same texture, with each version at a different resolution. These different versions can be referred to as "mipmap levels", or "levels". By using a low-resolution mipmap level image when an object is further from the camera, fewer texture elements need to be loaded when rendering the object. These texture elements are also referred to as "texels", with a "texel" defined as a discrete element which is the smallest unit of a texture. A "texel" of a texture is analogous to a "pixel" of a digital image.

A common approach to retrieving mipmap levels for a texture on a GPU is by using a pixel shader. Traditionally, the GPU computes a Level of Detail (LOD) for a rendered texture and issues an interrupt to a kernel driver. In response, an application queries an associated level of detail (LOD) value from the GPU. The application, based on the LOD value, retrieves texture data from storage and allocates a desired type of memory as its final destination. The retrieved data is then copied to a staging buffer. The application may then access the staging buffer to copy the texture data into its final destination which the application had identified beforehand. These conventional methods of accessing texture data involve traversing through many application and/or kernel layers and can therefore result in significant software overhead and latency issues.

In view of the above, improved systems and methods for efficient access to texture data are required.

BRIEF DESCRIPTION OF THE DRAWINGS

The advantages of the methods and mechanisms described herein may be better understood by referring to the following description in conjunction with the accompanying drawings, in which:

FIG. 6 illustrates a method for rendering an element of a scene using prefetched texture data.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for rendering textures by prefetching texture data are disclosed. Source texture data is identified based at least in part on one or more programmable instructions, such as synchronization instructions. A processor identifies the source texture data blocks required, the location of the data blocks through a mapping, and is configured to request the data blocks without the intervention of a central processor. Further, a list of the texture data blocks included within the source texture data and a mapping between each data block and a corresponding location of each data block in the memory device is maintained. Responsive to a request to load a given data block, the given data block is loaded from the memory device using the list and without invoking a CPU. The system overhead and latency issues resulting from the traditional CPU management of intermediate resources and copies are avoided.

Figure 1:
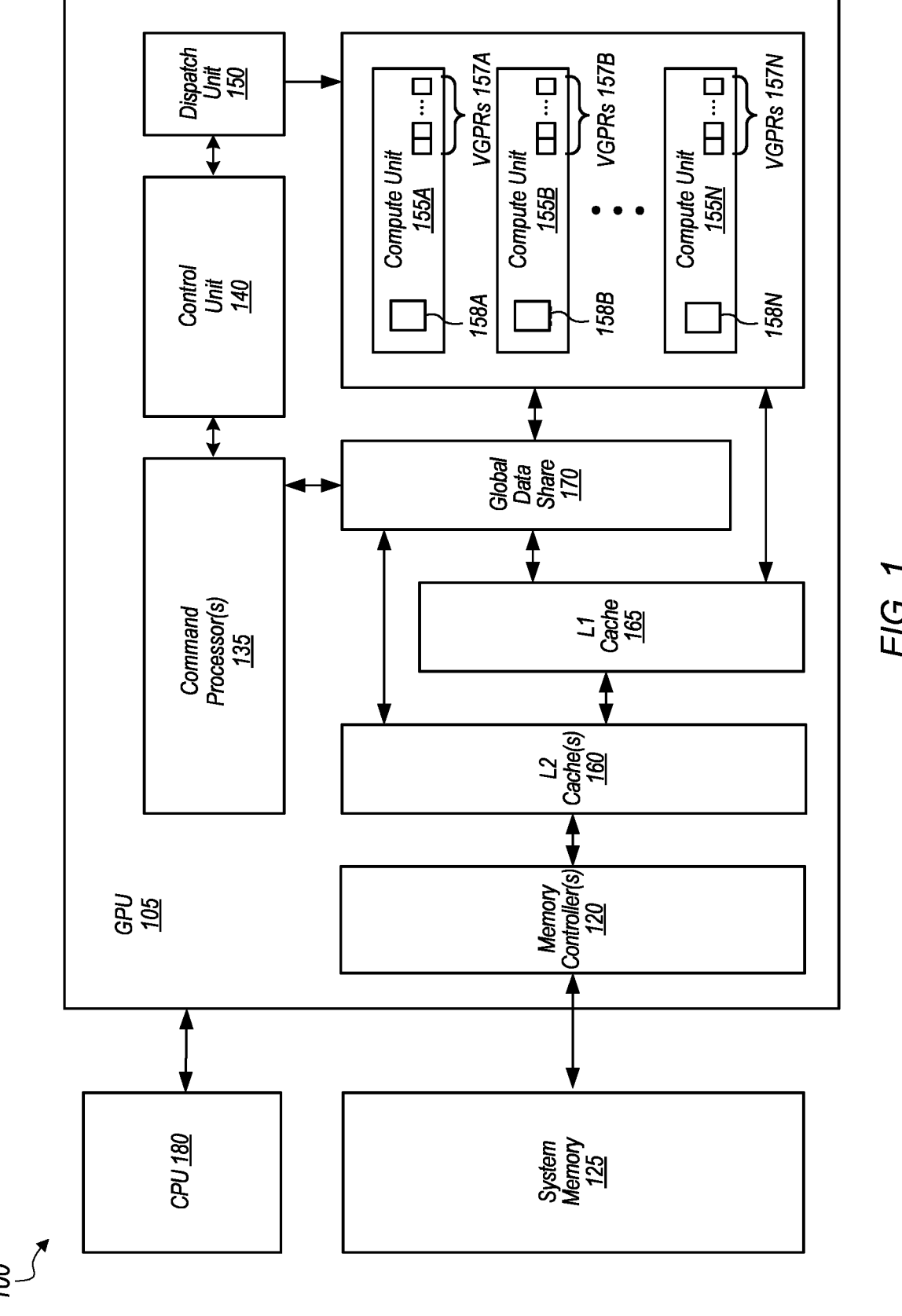
FIG. 1 is a block diagram of one implementation of a computing system.

Referring now to FIG. 1, a block diagram of one implementation of a computing system 100 is shown. In one implementation, system 100 includes central processing circuitry (e.g., CPU 180) and acceleration processing circuitry (e.g., a GPU 105, FPGA, or otherwise). System 100 further includes system memory 125. Further, GPU 105 includes at least command processor(s) 135, control unit 140, dispatch unit 150, compute units 155A-N, memory controller(s) 120, global data share 170, level one (L1) cache 165, and level two (L2) cache(s) 160. In various embodiments, compute units 155 includes an interface(s) configured to access local and/or external memory that stores data (e.g., source image texture data, etc.). In other implementations, GPU 105 includes other components, omits one or more of the illustrated components, has multiple instances of a component even if only one instance is shown in FIG. 1, and/or is organized in other suitable manners. System 100 can also include other components which are not shown to avoid obscuring the figure.

In various implementations, computing system 100 executes any of various types of software applications. As part of executing a given software application, the host CPU 180 of computing system 100 launches work to be performed on GPU 105. In one implementation, command processor 135 receives kernels from the host CPU 180, and command processor 135 uses dispatch unit 150 to issue corresponding wavefronts to compute units 155A-N. In one implementation, a wavefront launched on a given compute unit 155A-N includes a plurality of work-items executing on the single-instruction, multiple-data (SIMD) units of the given compute unit 155A-N. Wavefronts executing on compute units 155A-N can access vector general purpose registers (VGPRs) 157A-N and a corresponding local data share (LDS) 158A-N located on compute units 155A-N. It is noted that VGPRs 157A-N are representative of any number of VGPRs.

In one implementation, GPU 105 executes a single-pass compute shader downsampling kernel to downsample a source image texture stored in system memory 125. The downsampling kernel is executed in a single compute shader pass to generate all of the mipmap levels for the source image texture rather than performing a separate pass for each mipmap level. This helps to reduce the latency and power consumption associated with downsampling texture. Further, the GPU 105 is configured to identify and prefetch texture data, before the data is requested for access by execution of shader code, and stores the texture data into an accessible memory device. Each time textures are rendered, the GPU 105 can directly access the texture data from the accessible memory device, without having to cause the generation of interrupts to the CPU 180. These and other implementations are described in the description that follows.

Figure 2:
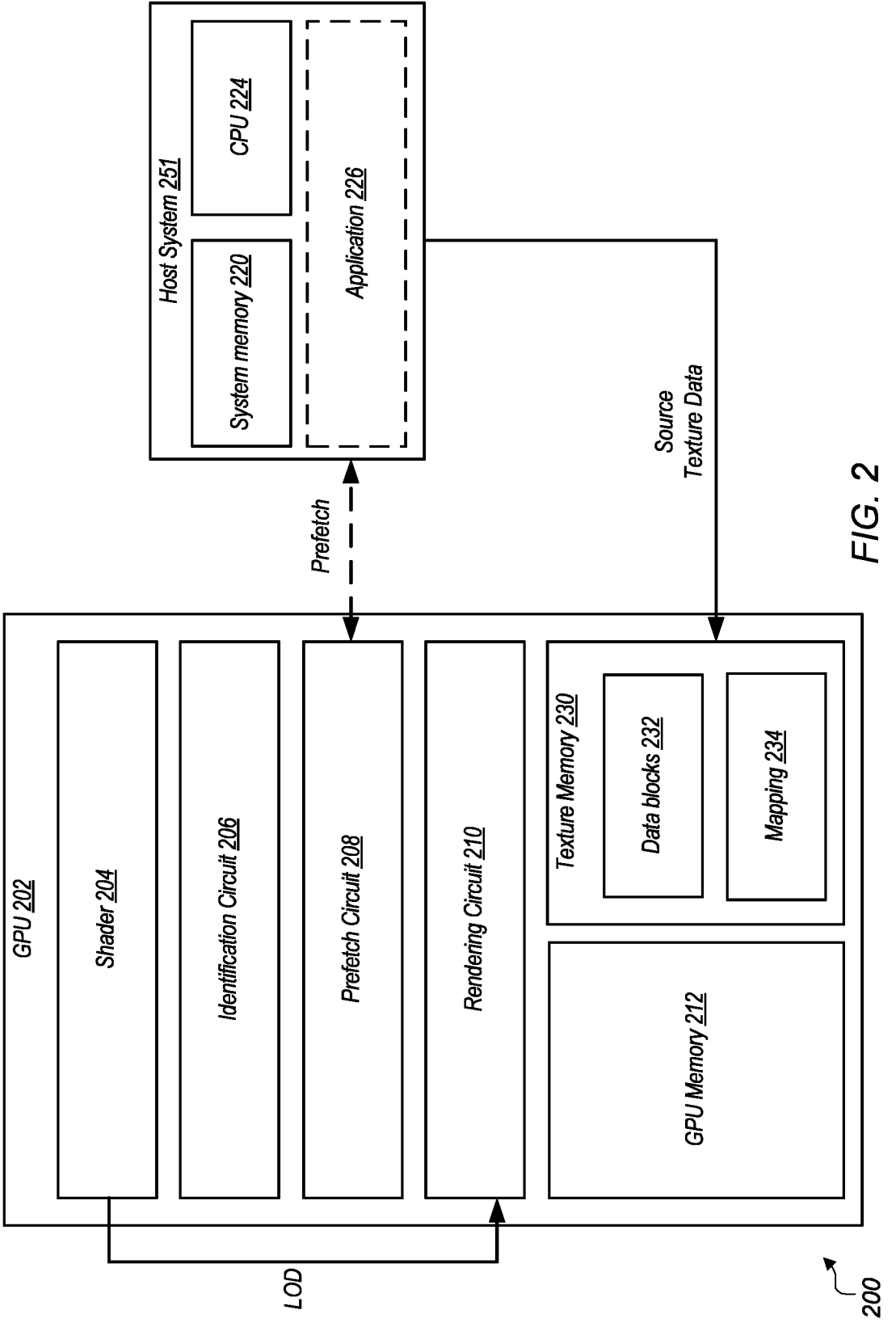
FIG. 2 is a block diagram of another implementation of a computing system.

Turning now to FIG. 2, a block diagram of another implementation of a computing system 200 is described. In an implementation, the system 200 comprises various components, including a host system 251, a GPU 202 and a texture memory 230. The host system 251, in one implementation, can be a gaming system or a personal computer. Further, an application 226, (e.g., a video game) is executed by the host system 251, which operates on a central processing unit (CPU) 224 of the host system 251. Data generated as a result of execution of the application 226 is stored in the system memory 226 of the host system 251. The GPU 202 includes shader 204, identification circuit 206, prefetch circuit 208, rendering circuit 210, and GPU memory 212. The system 200 can be incorporated into different devices such that the GPU 202 interacts with the CPU 224. Depending on the configuration, the GPU 202 can be located within or outside the host system 251. In an implementation, shader 204 includes circuitry configured to execute one or more operations, including but not limiting to, execution of shader code to request access to texture data during rendering of textures.

In an implementation, one or more frames or other elements of a scene are rendered using textures during execution of the application 226. As referred to herein, a texture is data that can be used for execution of an instruction, e.g., application of an image or pattern to a 3D model or background, or other computations not necessarily requiring computations. In one example, when texture data is applied to 3D models, it may be referred to as "texels." Texture data is used to add detail, color, and visual interest to a scene or object displayed onto a display device, and is an important part of creating realistic and immersive graphics. Other uses of texture data, e.g., application-specific uses are also possible and are contemplated. Referring again to FIG. 2, in one implementation, identification circuit 206 is configured to identify source texture data that would be necessitated for rendering a particular texture when executing elements of an application session for the application 226.

In one implementation, identification of source texture data is made before execution of shader code to access specific texture data for rendering a given texture. In one example, the source texture data includes frame or scene information for the application session as well as corresponding textures that would be needed to render these frames or scenes during execution. For instance, in a video game application, the source texture data includes digital images or patterns that are to be mapped onto surfaces of 3D models or 2D images during gameplay.

In an implementation, the identification circuit 206 is configured to identify the source texture data based on one or more programmable instructions. In an example, the programmable instructions include synchronization instructions in the shader code of shader 204. Synchronization instructions are used to control an ordering of operations between different threads executing on the GPU 202. These instructions are typically used to ensure that shared resources such as memory and texture data are accessed in a consistent and predictable manner. Some examples of synchronization instructions in shader code include memory barriers, atomic operations, semaphore operations, and the like. In one implementation, the identification of source texture data is performed based on application-controlled program code executed on the GPU 202. Before rendering a scene, the GPU 202 is configured to identify data sets (e.g., the vertices, object coordinates, texture references, etc.) and based on the data sets can determine how far a particular object in the scene is from the observer's viewpoint. Further, in an implementation, the GPU 202 determines, based on this distance between the object and the observer, different texture images best representing how that object should look like on a display. Based on the data sets and texture images, the identification circuit 206 identifies the source texture data to be used when rendering a texture.

In one implementation, the prefetch circuit 208 prefetches the identified source texture data, e.g., initially stored in system memory 220. In an implementation, the prefetch circuit 208 is configured to prefetch data blocks of the source texture data, e.g., based on a determination of which texture block would be required at what level of detail associated with source texture data. Further, in one implementation, the identification circuit 206 can identify the source texture data before it is used for processing textures, such that the prefetch circuit 208 prefetches the data blocks using level of detail (LOD) information corresponding to the execution of the application 226.

In one example, when the execution of the application 226 includes rendering of a large 3D environment, such as a game world, the textures are often repeated in a pattern to create large surfaces. In order to reduce the repetition of textures, texture tiling can be used to ensure that unique textures are available. In one implementation, the prefetch circuit 208 prefetches data blocks of the source texture data including tiling data. In another implementation, LOD can be used, in tandem with tiling data, to dynamically adjust texture resolution based on the distance from the viewer. When the viewer is far away, the program can use lower resolution textures created from smaller texture tiles, which will be less noticeable due to their reduced size. As the viewer moves closer, the program can switch to higher resolution textures created from larger texture tiles, which will provide more visual detail and clarity. The prefetch circuit 208 can further use this LOD information to prefetch the tiling data.

The data blocks, in one implementation, are prefetched and loaded onto the texture memory 230 by the prefetch circuit 208. In an example, the data blocks include texture tiles and/or mipmap ranges associated with the source texture data. In an implementation, the textures for a particular scene to be rendered can be generated using mipmaps. In various implementation, the data can be managed in a tiled format. For instance, when using texture tiles to create textures, smaller texture tiles are tiled to create a larger texture. For example, the texture tiles may be loaded as separate 2D images. Then, a processing unit can determine how the tiles should be arranged and repeated to create the larger texture. This may involve scaling, rotating, or flipping the tiles as needed to fit the surface correctly. Further, mipmaps can also be used for creating textures. In another example, mipmaps are precomputed, down sampled versions of a texture that are generated to improve performance during texture filtering. When a texture is rendered at a distance, the individual pixels may become too small to distinguish, resulting in aliasing artifacts. Mipmaps help to address this problem by providing a series of smaller, precomputed versions of the texture, which can be used in place of the full texture when rendering at a distance.

In an implementation, the prefetch circuit 208 further generates a mapping between each data block and corresponding memory address space allocated to each data block in the texture memory 230. According to the implementation, the prefetch circuit 208 is configured to prefetch and load each data block at the texture memory 230 and create a mapping defining a memory location of the texture memory 230, where each data block is loaded. In one implementation, the mapping can further include a correlation between each block of source texture data and a corresponding LOD value. The prefetch circuit 208 is further configured to create and maintain a list including the mapping of each data block, corresponding LOD values, and associated memory address spaces in the texture memory 230. In an implementation, the list is stored in the texture memory 230 as mapping 234. In other implementations, the list can also be stored at any other memory location accessible by the GPU 202. Further, the data blocks are prefetched and stored to the texture memory 230 as data blocks 232.

As depicted in FIG. 2, the texture memory 230 is a form of a digital storage that ensures quick access to data blocks 232. In one or more implementations, the texture memory 230 can utilize specialized RAM, specifically designed for fast read and write operations, which enhances the performance of graphics hardware in rendering 3D visuals. However, specialized RAM is not a requirement. In an implementation, texture memory 230 can be located on the GPU 202, as shown, or within a system graphics card. In other implementations, the texture memory 230 can also be a part of the system memory 220. Further, in an implementation, the texture memory 230 is a non-volatile memory (NVM) such as flash memory, Electrically Erasable Programmable Read-Only Memory (EEPROM), Ferroelectric Random Access Memory (FRAM), Magneto-resistive Random Access Memory (MRAM), Non-Volatile Random Access Memory (NVRAM), volatile memory such as ROM, or a combination thereof.

Advantageously, prefetching the data blocks as well as maintaining the mapping between each data block and a respective memory address space enables direct communication between GPU 202 and memory device 230, during rendering of a scene, allowing a substantial reduction in fetching data dependent content from the texture memory 230, without extensive logistical management on the application 226 side or in the operating system (OS) runtimes for the host system 251. In one implementation, the prefetch circuit 208 generates the list as a table of file content offsets or handles such that the GPU 202 can directly issue read requests when texture data is required for processing textures. By enabling the GPU 202 to directly access the memory, the systems and methods presented herein avoid the overhead that would otherwise be incurred by interrupting and using the CPU to access and manage the data.

According to an implementation, when the application 226 is executed and a given texture is to be rendered, the shader 204 identifies a level of detail (LOD) required to render the texture. The rendering circuit 210, based on the identified LOD, issues a memory request to the texture memory 230 to access one or more data blocks corresponding to the identified LOD. In other implementations, the request to access the one or more data blocks can further be issued responsive to application-specific conditions, in addition to the identified LOD (or conditions other than the identified LOD). The memory request, in one example, is a direct memory access (DMA) request. In one implementation, based on the mapping between the data blocks and corresponding LOD information as defined in the data maps 232, the rendering circuit 210 accesses the data blocks and determines whether these data blocks are ready for consumption. When it is determined that the data blocks are ready for consumption, the rendering circuit 210 loads the tiles to the GPU memory 206 and renders the scene or frame using the loaded data blocks.

Figure 5:
FIG. 5 illustrates a method for enabling processing circuitry to directly access texture data from a memory device.
Figure 5:
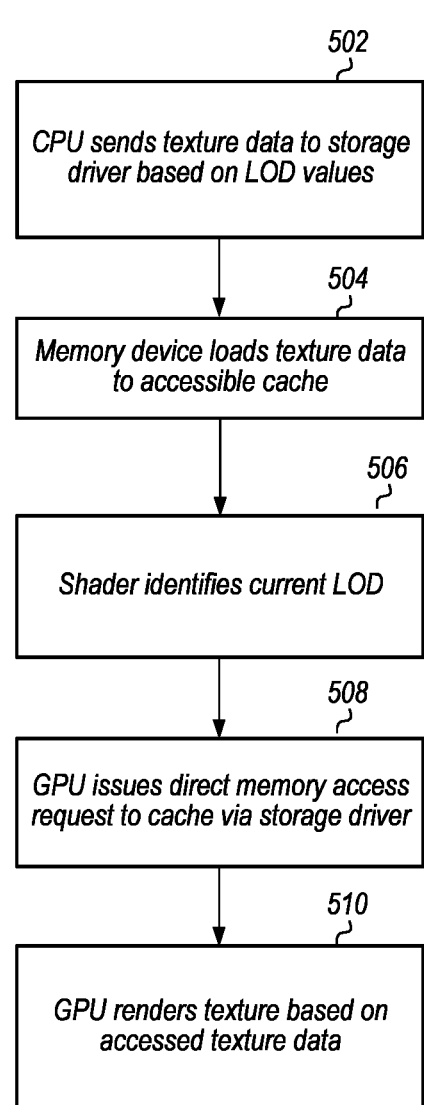

The systems and methods described herein enable identification and prefetching of texture data, prior to the data being needed to render textures, to substantially improve performance of sampler-based feedback use case scenarios (as illustrated in FIG. 5) and otherwise. The techniques described herein allow the GPU 202 to directly identify and initiate the loading of required data from the texture memory 230 computationally, e.g., based on LOD, instead of utilizing the traditional path of issuing an interrupt to a driver and computing the data location in response to the interrupt. Further, initiating multiple memory requests to the driver stack and the graphics drivers to copy the data from the texture memory 230 to a staging buffer, and from the staging buffer to a GPU accessible resource, can be avoided. Advantageously, overhead for the host system 251 is reduced and faster processing of data as well as better leveraging high bandwidth memory resources for the GPU 206 can be realized. The CPU 224 resources can resultantly be used for better uses such as improving frame render latency overheads. This substantially improves the responsiveness of the application (e.g., when the scenery needs to quickly switch due to user interaction) for substantially improved immersiveness.

In some implementations, the circuits described with reference to FIG. 2, such as but not limiting to, identification circuit 206, prefetch circuit 208, rendering circuit 210, etc. are implemented in hardware to achieve fast processing. Further, in some implementations, these circuitries may be combined into a single circuit or multiple circuits. Such implementations are contemplated. Also, software implementations of the above circuitries are not precluded. For instance, in some implementations, the functionalities of the identification circuit 206, prefetch circuit 208, and rendering circuit 210 can be integrated in software, e.g., in the shader code executed by the shader 204.

Figure 3:
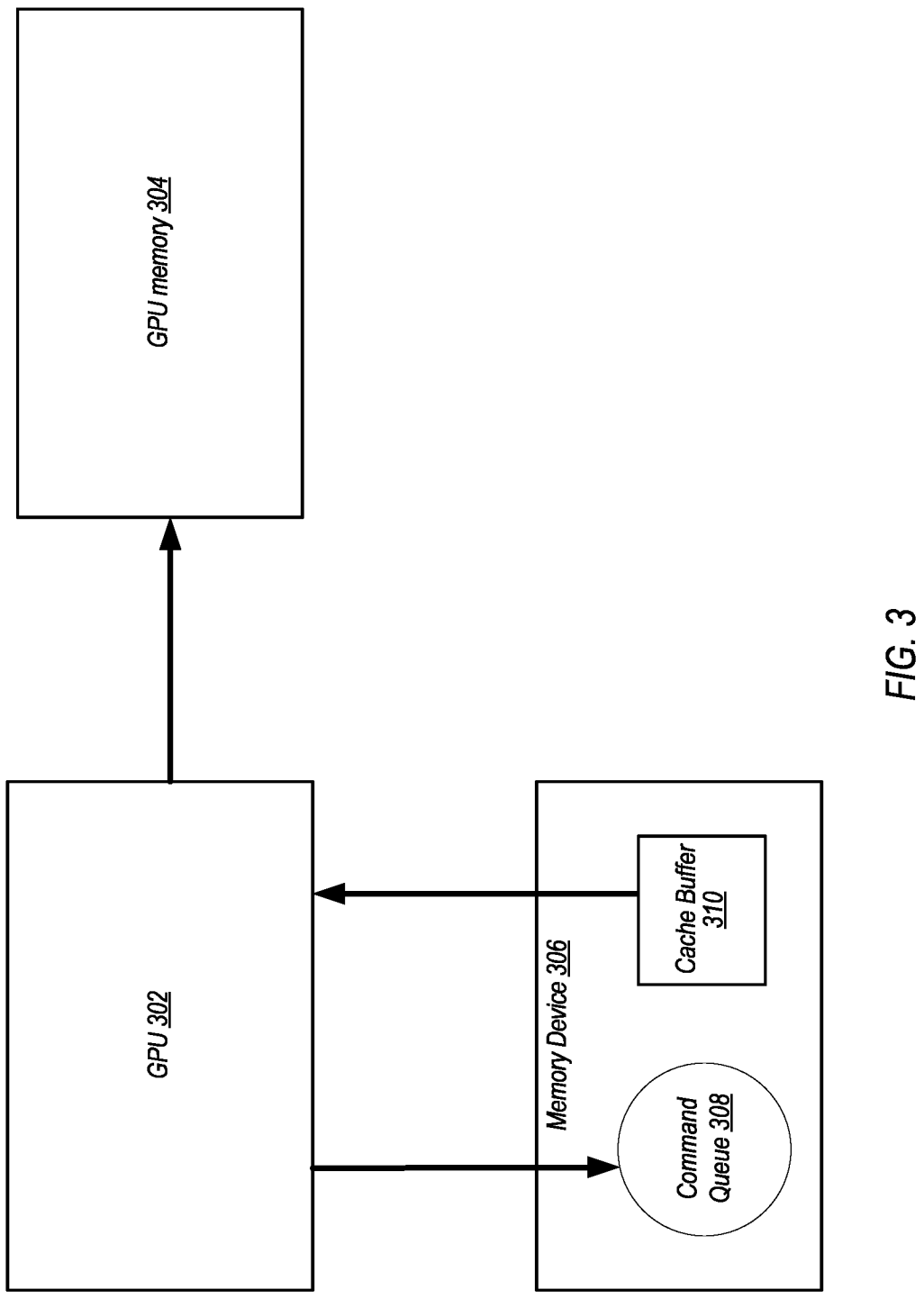
FIG. 3 is a block diagram of one implementation of processor-initiated data transfer between memory devices.

FIG. 3 illustrates a processor-initiated transfer of data between memory devices. As shown in the figure, GPU 302 accesses the memory device 306 (the memory device 306, in an implementation, is a texture memory, as described in FIG. 2) for data, e.g., texture data. In an implementation, the GPU 302 loads texture data that is ready for consumption to a local memory location accessible to the GPU 302, e.g., GPU memory 304.

In one implementation, prior to rendering a texture by the GPU 302, texture data associated with the render is identified by the GPU 302 and prefetched and loaded to a memory device, e.g., memory device 306. In an example, the memory device 306 is a non-volatile memory (NVM) device. In an implementation, the texture data prefetched and stored at the memory device 306 is stored in an accessible cache buffer 310, using a cache buffer driver (not shown). For example, texture data from a main system memory (e.g., system memory 220 described in FIG. 2) is transferred to the cache buffer 310 by a cache buffer driver. Further, the cache buffer driver maintains the consistency of data between the cache and the main memory, and ensures that the data in the cache buffer 310 is up to date.

In an implementation, the texture data prefetched at the cache buffer 310 is mapped to corresponding memory address spaces in the memory device 306, and this mapping is also stored, during prefetch, in the cache buffer 310 as a list. In an implementation, a host CPU is not used as an intermediary to synchronize between tasks on the GPU 302 and the memory device 306, and rather a memory address space is defined, indicating to the GPU 302 that the memory device 306 has delivered the texture data in the assigned memory address space and that the GPU 302 can process it when required. In one example, the memory address space is defined as a synchronization status in a variable, and the value inside the variable defines what state the texture data is in. Because the memory device 306 and the GPU 302 communicate using a negotiated protocol (e.g., as defined by a system programmer), using the particular state the GPU 302 determines that the data is ready for consumption, without the requirement of a host interrupt or other system reference.

As described in the foregoing, the prefetch of the texture data from a system memory is performed by the GPU 302 based at least in part on level of detail (LOD) information associated with the texture data. In an implementation, the list stored in the cache buffer 310 further includes of a mapping between data blocks of the texture data with associated LOD values. In an example, this association is stored in the cache buffer 310 in the form of a lookup table. Other implementations of storing this association in the cache buffer 310 are contemplated.

According to an implementation, when a scene is to be rendered using textures, the GPU 302 calls out data blocks from the prefetched texture data from the memory device 306. In one example, the data blocks are selected based at least in part on LOD values determined for the texture to be rendered. In an implementation, the LOD values are identified by a shader program or code executing on the GPU 302. Using the mapping of the LOD values with respective data blocks, the GPU 302 identifies data blocks to be loaded to a local memory device, such as GPU memory 304.

In an implementation, in order to access the one or more data blocks, the GPU 302 transmits a memory request, e.g., a DMA request, to the memory device 306. Responsive to the request, the request is stored in memory command queue 308. In an implementation, the command queue 408 stores commands such as read and write requests, and these commands are executed in the order they are received. Once the data blocks are determined to be ready for consumption, these are loaded from the cache buffer 310 to the GPU memory 304, to be accessed by the GPU 302. The GPU 302 can render the texture using the data blocks, and continue accessing other data blocks independently from the memory device 406 as and when textures are to be rendered.

In one implementation, the GPU 402 accesses texture data from the memory device 306, using a Non-Volatile Memory Access (e.g., NVMe) interface. For instance, the memory device 306 can include solid-state drives (SSDs) such that the GPU 302 uses a NVMe communications interface designed specifically for accessing solid-state drives (SSDs) over a host system's Peripheral Component Interconnect Express (PCIe) bus.

In an implementation, the systems and methods described herein allow for the GPU 302 to directly access the command queue 308 of the memory device 306 (e.g., a nonvolatile memory device), to access texture data directly from the memory device 306, without requiring the GPU 302 to generate interrupt signals to a CPU for the same. In doing so, the texture data is made directly available to the GPU 302 for further processing and rendering of textures, thereby eliminating substantial overhead at each of these steps for communicating the request. In one implementation, the GPU 302 can determine, at execution time, which LOD is needed for a particular texture and can pull associated texture data dynamically from the memory device 306. This is in contrast to requiring the GPU 302 to fire interrupt signals to a kernel driver that then is surfaced to the CPU and then forwarded to a storage stack by the CPU, all of which introduces overhead.

Figure 4:
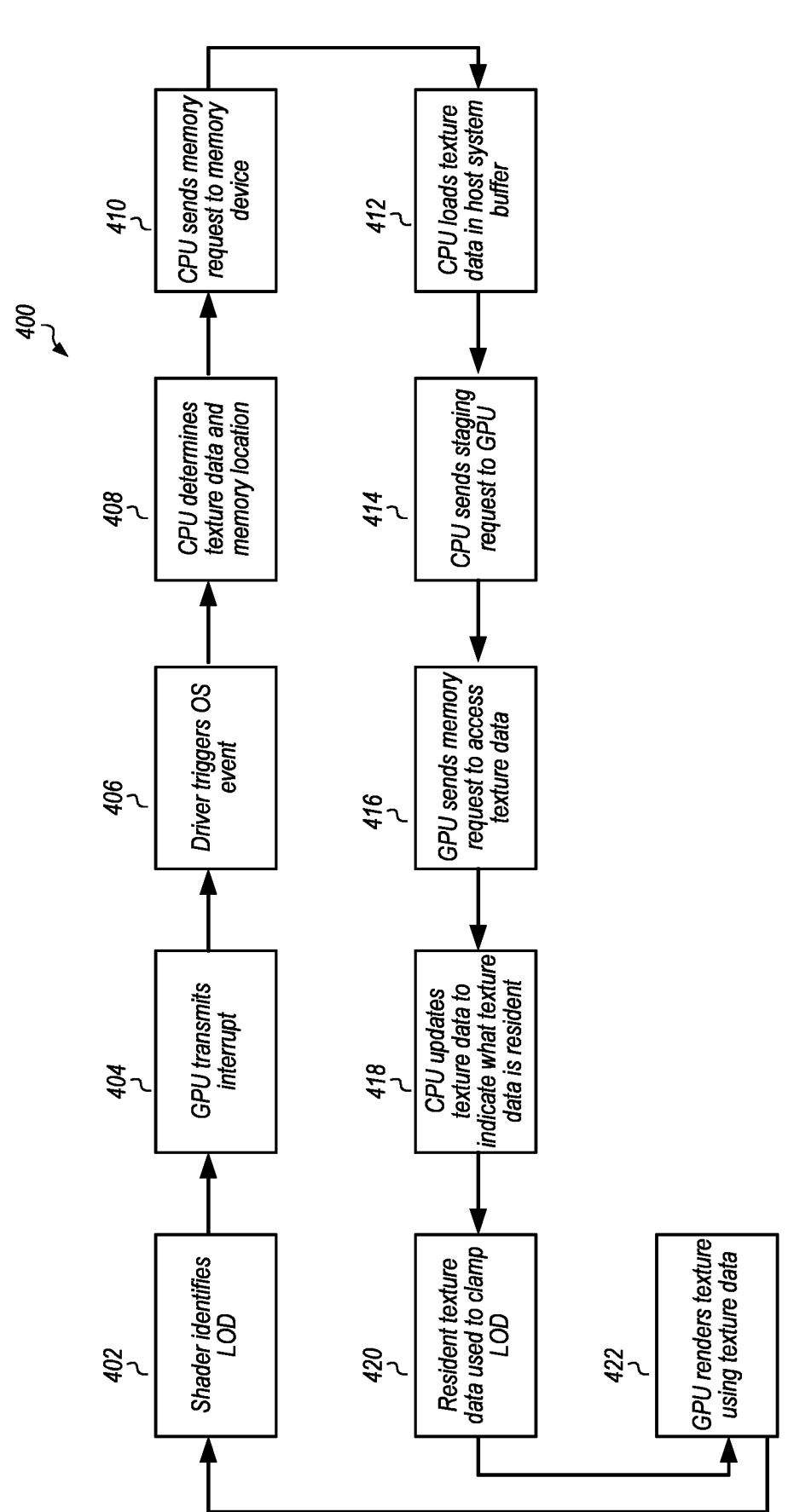
FIG. 4 illustrates a method for rendering an element of a scene using sampler-based feedback.

Turning now to FIG. 4, a flowchart 400 illustrating render of an element of a scene using sampler-based feedback is described. Arrows in the flowchart 400 depict how computational processes occur in a computing system, such as a gaming system or a personal computer.

As depicted, during rendering of a texture, a level of detail (LOD) value for the render is identified by a shader (block 402). As described in the foregoing, the LOD values are identified in response to a shader program executed by a GPU. LOD values can be used to dynamically adjust texture resolution of an object based on its distance from the viewer. Based on the identified LOD, the GPU transmits an interrupt to a kernel driver (block 404). In an example, the GPU transmits the interrupt to the driver to call for texture data required for rendering the scene at the determined LOD value.

In response to the interrupt the driver triggers an operating system (OS) event to the application being executed (block 406). In one example, the OS event is indicative of a request to fetch texture data from a memory device (e.g., host system memory). The OS event can be triggered for the CPU of the host system.

Responsive to the OS event, the CPU reads the LOD values and determines the appropriate texture data as well as a memory location at which the requested texture data is stored (block 408). In an implementation, the CPU identifies the appropriate texture data based on the scene being rendered and configuration settings of the application being executed. Further, once the relevant texture data location is identified, the CPU sends a memory request (e.g., a DMA request) to a memory controller of the memory device (block 410) to retrieve the texture data.

Based on the response to the memory request, the CPU loads the texture data, for example including texture tiles and mipmap ranges, into a host system buffer from the memory device (block 412). Further, once the texture data is ready to be consumed, the CPU transmits a staging request (e.g., another DMA request) to the GPU (block 414). Once the GPU receives the staging request, it is configured to send another DMA request to the memory device to access the texture data (block 416). Responsive to the DMA request by the GPU to access the texture data, the CPU updates texture data to indicate what texture data is resident on the memory device (block 418), e.g., by sending another memory request to the memory device.

Once the resident texture data is identified and updated, the texture data is used during sampling to clamp the LOD value to the resident texture data (block 420). When clamping LOD to texture data, the CPU restricts the LOD to a specific range based on the available texture data. Instead of dynamically adjusting the LOD based on distance or object size, the LOD value is clamped within a predetermined range. The GPU is configured to render the texture using the texture data (block 422). The process is repeated for each separate texture to be rendered.

Turning now to FIG. 5, a method 500 for enabling a graphics processing unit to directly access texture data from a memory device is illustrated. Obtaining texture data in the method of FIG. 4 can cause generation of an interrupt to a driver and computation of a location of texture data in response to the interrupt. Initiating multiple memory requests to the driver stack and the graphics drivers to copy the texture data from the memory to a staging buffer, and from the staging buffer to a GPU accessible resource, can result in system overhead and latency issues. In contrast, the method 500 utilizes prefetched texture data in order to reduce latency and overhead issues by enabling a processor to communicate directly with a memory device, without invoking a host CPU. Further, clamping of LOD based on resident texture data can be eliminated, since texture data can be predicted and prefetched, before a shader code is executed to request access to this data, based at least part on distinct LOD values, thereby allowing for dynamic adjustment of LOD values based on distance or object size.

As described in the foregoing, for rendering textures, texture data is required. Texture data can include mipmap ranges, texture tiles, or other data, to render a texture based on an appropriate level of detail (LOD) value. According to the implementation depicted using method 500, this texture data is predicted by a GPU, so that the GPU can prefetch this texture data, before this data is needed to be accessed. The prefetch, in one implementation, includes the CPU sending the predicted texture data to a storage driver based on LOD values (block 502). Further, a memory device loads this prefetched texture data into an accessible cache (block 504).

In one implementation, when a texture is to be rendered, a shader executes a shader program to identify a LOD associated with the texture to be rendered (block 506). In one implementation, based on the identified LOD, blocks of texture data to be accessed are identified by the GPU. According to an implementation, in order to access these blocks of texture data, the GPU issues, via the storage driver, a direct memory access (DMA) request to the memory device storing prefetched texture data (block 508). Accordingly, using the DMA request, the GPU is able to access the texture data blocks without invoking additional processing units (e.g., a CPU). Further, the GPU renders the texture based on the accessed texture data (block 510).

The techniques described with respect to method 500 allow the GPU to directly identify and initiate the loading of required texture data from a memory device computationally, e.g., based on LOD, before such data is needed to be accessed. Further, utilizing multiple communication paths of issuing an interrupt to the storage driver and then computing the data location in response to the interrupt is eliminated. Initiating multiple memory requests to the driver storage stack and the graphics drivers to copy the data from the memory device to a GPU accessible resource can also be avoided. Advantageously, overhead for the host system is reduced and faster processing of data as well as better leveraging high bandwidth memory resources for the GPU can be realized.

FIG. 6 illustrates a method 600 of rendering a texture using prefetched texture data. As shown in the figure, the method 600 is divided into two sub-methods. The flow diagram depicted on the left side of the page illustrates a method of prefetching texture data, while the flow diagram on the right side of the page illustrates a method for using the prefetched data to render textures. These sub-methods are marked as such. In an implementation, the prefetching of texture data is performed before a shader code is executed to request access to the texture data. During prefetch, source texture data is identified (block 602) by a GPU. In an implementation, the source texture data is identified using one or more programmable instructions, e.g., synchronization instructions. The source texture data may include texture tiles and mipmaps associated with rendering a given texture.

In an implementation, the GPU causes a prefetch of the identified source texture data (block 604). In an example, the GPU prefetches the source texture data from a system memory or any other memory location. Further, the prefetch of the source texture data is performed based at least in part of level of detail (LOD) values associated with the texture data. As described in the foregoing, LOD values can be used to dynamically adjust texture resolution of an object based on its distance from the viewer.

Once the source texture data is fetched from the memory device, e.g., into an accessible cache, the GPU generates a mapping between (data) blocks of the texture data and their locations in the cache. In an implementation, to enable direct communication between the GPU and the cache without requiring involvement of a CPU, the mapping is used by the GPU to access required data blocks during rendering. In an implementation, the prefetching of source texture data and generation of the mapping (i.e., method blocks 602-606) is performed before a shader code is executed requesting access to the source texture data.

To render textures, shader code executing in the GPU identifies a LOD value of a current texture to be rendered (block 608). In an implementation, the texture to be rendered is determined based on a scene or a frame to be displayed onto a display device. The GPU then transmits a memory request to access prefetched data blocks to the cache (block 610). In an implementation, the memory request is a DMA request. Responsive to receiving a response from the cache, to the transmitted memory request, the GPU is configured to select a data block from the data blocks based on the identified LOD (block 612). In one implementation, the selection of the data block is performed at least based in part on the mapping generated during prefetch.

The GPU further determines whether the selected block is ready for consumption (conditional block 614). If the selected block is not ready for consumption (conditional block 614, "no" leg), the GPU is configured to wait for the data block to be ready for consumption. Once the data block is ready for consumption (conditional block 614, "yes" leg), the GPU loads the data block to a GPU memory (block 616). Further, the texture is rendered using the loaded data block (block 618).

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
   a prefetch circuit configured to:
      cause a prefetch of texture data from a memory device into a cache, using a direct memory access; and
      generate a mapping that identifies a location of blocks of the texture data in the cache; and
   a rendering circuit configured to:
      receive a request to load a given data block; and
      retrieve the given data block from cache, based at least in part on the mapping.

2. The processor as claimed in claim 1, wherein the mapping further comprises an association of the blocks of texture data with corresponding level of detail values.

3. The processor as claimed in claim 1, wherein the request comprises a level of detail associated with the given data block.

4. The processor as claimed in claim 1, wherein the processor further comprises a shader configured to execute a shader program to identify a level of detail associated with the given data block.

5. The processor as claimed in claim 1, wherein the rendering circuit is further configured to:

load, based at least in part on the direct memory access, the given data block from the cache to a memory location accessible by the processor, responsive to an identification that the given data block is ready for consumption; and render a texture using the given data block.

6. The processor as claimed in claim 1, wherein the prefetch circuit is configured to prefetch the texture data before a request to access the texture data is received by the rendering circuit.

7. The processor as claimed in claim 1, wherein the mapping is generated before a request to access the texture data is received by the rendering circuit.

8. The processor as claimed in claim 1, wherein the texture data comprises one or more of texture tiles and mipmap ranges associated with a texture corresponding to a scene.

9. A method comprising:

causing, by prefetch circuitry of a processor using a direct memory access, a prefetch of texture data from a memory device into a cache; and generating a mapping that identifies a location of blocks of the texture data in the cache; and receiving, by a rendering circuit, a request to load a given data block; and retrieving the given data block from cache, based at least in part on the mapping.

10. The method as claimed in claim 9, wherein the mapping further comprises an association of the blocks of the texture data with corresponding level of detail values.

11. The method as claimed in claim 9, wherein the request at least comprises a level of detail associated with the given data block.

12. The method as claimed in claim 9, further comprising executing a shader program to identify a level of detail associated with the given data block.

13. The method as claimed in claim 9, further comprising:

loading, by the rendering circuit, based at least in part on the direct memory access, the given data block from the cache to a memory location accessible by the processor, responsive to an identification that the given data block is ready for consumption; and rendering, by the rendering circuit, a texture using the given data block.

14. The method as claimed in claim 9, further comprising prefetching, by the prefetch circuitry, the texture data before a request to access the texture data is received by the rendering circuit.

15. The method as claimed in claim 9, wherein the mapping is generated before a request to access the texture data is received by the rendering circuit.

16. The method as claimed in claim 9, wherein the texture data comprises one or more of texture tiles and mipmap ranges associated with a texture corresponding to a scene.

17. A system comprising:

central processing circuitry; and accelerated processing circuitry configured to:

cause a prefetch of texture data from the central processing circuitry into a cache;

generate a mapping that identifies a location of blocks of texture data in the cache, wherein the mapping enables a direct memory access between the accelerated processing circuitry and the cache;

receive a request to load a given block of the texture data; and access the given block from a memory device based at least in part on the mapping.

18. The system as claimed in claim 17, wherein the accelerated processing circuitry is further configured to:

load, based at least in part on the access, the given block from cache to a memory location accessible by the accelerated processing circuitry, responsive to an identification that the given block is ready for consumption; and render a texture using the given block.

19. The system as claimed in claim 17, wherein the accelerated processing circuitry is configured to prefetch the texture data before a request to access the texture data is received by the accelerated processing circuitry.

20. The system as claimed in claim 17, wherein the mapping is generated before a request to access the texture data is received by the accelerated processing circuitry.

* * * * *